US012802526B2

(12) United States Patent
Trivedi et al.

(10) Patent No.: US 12,802,526 B2
(45) **Date of Patent: *Nov. 17, 2026**

(54) SYSTEMS AND METHODS FOR CROSS-GAME PROGRESSIVE JACKPOT DETERMINATION BASED UPON WAGER AMOUNT

(71) Applicant: Aristocrat Technologies Australia Pty Limited, North Ryde (AU)

(72) Inventors: Alok Trivedi, Kanpur (IN); Shailendra Tomar, Bulandshahr (IN); Rakesh Mehta, Nainital (IN); Jitin Garg, Ghaziabad (IN)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 182 days.

This patent is subject to a terminal disclaimer.

(21) Appl. No.: 18/884,734

(22) Filed: Sep. 13, 2024

(65) Prior Publication Data

US 2025/0006004 A1 Jan. 2, 2025

Related U.S. Application Data

(63) Continuation of application No. 17/930,701, filed on Sep. 8, 2022, now Pat. No. 12,118,852, which is a (Continued)

(51) Int. Cl.
*G07F 17/32* (2006.01)

(52) U.S. Cl.
CPC ........ *G07F 17/3258* (2013.01); *G07F 17/329* (2013.01)

(58) Field of Classification Search
CPC ...... G07F 17/3258; G07F 17/329; A63F 3/06; A63F 3/0605; A63F 3/061; A63F 3/062; A63F 3/0645
See application file for complete search history.

(56) References Cited

U.S. PATENT DOCUMENTS 6,099,407 A 8/2000 Parker, Jr.
7,172,505 B2 2/2007 Vancura (Continued)

OTHER PUBLICATIONS

Office Action dated Dec. 23, 2020 for U.S. Appl. No. 16/507,934 (pp. 1-11).

(Continued)

*Primary Examiner* — Milap Shah
(74) *Attorney, Agent, or Firm* — Armstrong Teasdale LLP

(57) ABSTRACT

An electronic gaming system includes a processor configured to execute instructions, which when executed, cause the processor to at least receive a wager amount and a bingo card parameter from an electronic gaming machine (EGM) that is communicatively coupled to the electronic gaming system. The instructions may also cause the processor to determine, based upon the wager amount, a subset of a plurality of bingo card parameters and compare the received bingo card parameter to the subset of the plurality of bingo card parameters to determine whether the received bingo card parameter matches any bingo card parameter of the subset of the plurality of bingo card parameters, where each bingo card parameter of the plurality of bingo card parameters is associated with a progressive jackpot. In addition, the instructions may cause the processor to award the progressive jackpot to a player of the EGM in response to determining that the received bingo card parameter matches a bingo card parameter of the subset of the plurality of bingo card parameters.

20 Claims, 9 Drawing Sheets

Related U.S. Application Data continuation of application No. 17/333,967, filed on May 28, 2021, now Pat. No. 11,443,595, which is a continuation of application No. 16/507,934, filed on Jul. 10, 2019, now Pat. No. 11,024,121.

(56) References Cited

U.S. PATENT DOCUMENTS

| | | | | |
|---|---|---|---|---|
| 7,481,707 | B1 | 1/2009 | Luciano, Jr. | |
| 7,959,509 | B2 | 6/2011 | Saffari | |
| 8,192,279 | B2 | 6/2012 | Saffari | |
| 8,500,538 | B2 | 8/2013 | Warner | |
| 8,821,248 | B2 | 9/2014 | Warner | |
| 10,002,494 | B2 | 6/2018 | Saffari | |
| 10,463,949 | B2 | 11/2019 | Yarbrough | |
| 11,024,121 | B2 | 6/2021 | Trivedi | |
| 11,443,595 | B2 | 9/2022 | Trivedi | |
| 12,118,852 | B2 * | 10/2024 | Trivedi | G07F 17/3258 |
| 2002/0094859 | A1 | 7/2002 | Hirsch | |
| 2003/0104865 | A1 | 6/2003 | Itkis | |
| 2005/0059471 | A1 | 3/2005 | Cannon | |
| 2005/0187014 | A1 | 8/2005 | Saffari | |
| 2006/0154718 | A1 | 7/2006 | Willyard | |
| 2008/0254854 | A1 | 10/2008 | Slomiany | |
| 2009/0075715 | A1 | 3/2009 | Coleman | |
| 2011/0028201 | A1 | 2/2011 | Warner | |
| 2011/0287823 | A1 | 11/2011 | Guinn | |
| 2015/0011288 | A1 | 1/2015 | Colvin | |
| 2015/0080117 | A1 | 3/2015 | Czyzewski | |
| 2015/0080118 | A1 | 3/2015 | Harris | |
| 2016/0063817 | A1 | 3/2016 | Guinn | |
| 2016/0117884 | A1 | 4/2016 | Weingardt | |
| 2018/0025587 | A1 | 1/2018 | Waters | |
| 2018/0102027 | A1 | 4/2018 | Paiva | |
| 2019/0295375 | A1 | 9/2019 | Hallerbach | |

OTHER PUBLICATIONS

Notice of Allowance dated Feb. 4, 2021 for U.S. Appl. No. 16/507,841 (pp. 1-7).

Notice of Allowance dated Apr. 21, 2021 for U.S. Appl. No. 16/507,934 (pp. 1-6).

Notice of Allowance dated May 13, 2021 for U.S. Appl. No. 16/507,841 (pp. 1-5).

Office Action (Non-Final Rejection) dated Mar. 25, 2022 for U.S. Appl. No. 17/333,967 (pp. 1-7).

Office Action (Notice of Allowance and Fees Due (PTOL-85)) dated May 5, 2022 for U.S. Appl. No. 17/333,967 (pp. 1-5).

Office Action (Non-Final Rejection) dated Sep. 28, 2023 for U.S. Appl. No. 17/344,642 (pp. 1-19).

Office Action (Notice of Allowance and Fees Due (PTOL-85)) dated Feb. 14, 2024 for U.S. Appl. No. 17/344,642 (pp. 1-5).

Office Action dated Apr. 10, 2024 for U.S. Appl. No. 17/930,701 (pp. 1-11).

Office Action dated Aug. 6, 2020 for U.S. Appl. No. 16/507,841 (pp. 1-10).

Office Action (Notice of Allowance and Fees Due (PTOL-85)) dated Aug. 2, 2024 for U.S. Appl. No. 17/930,701 (pp. 1-5).

Office Action (Final Rejection) dated Sep. 8, 2025 for U.S. Appl. No. 18/623,800 (pp. 1-16).

Office Action (Non-Final Rejection) dated Mar. 18, 2026 for U.S. Appl. No. 18/623,800 (pp. 1-17).

* cited by examiner

| FIRST JACKPOT TABLE | SECOND JACKPOT TABLE | THIRD JACKPOT TABLE | FOURTH JACKPOT TABLE |
|---|---|---|---|
| BINGO CARD PARAMETER (CARD ID) | BINGO CARD PARAMETER (CARD ID) | BINGO CARD PARAMETER (CARD ID) | BINGO CARD PARAMETER (CARD ID) |
| 4567 | 2376 | 3341 | 9843 |
| 2376 | 3341 | 5239 | 2585 |
| 9843 | 2585 | 4529 | 5239 |
| 4333 | 3212 | 4512 | 4141 |
| 8963 | 5522 | 1245 | 2288 |
| 9723 | 6634 | 3265 | 4826 |
| 9933 | 8989 | 9999 | 1515 |
| 2241 | 4122 | 5489 | 1415 |
| 5547 | 6545 | 8852 | 5723 |
| 4545 | 7894 | 7456 | 7159 |

FIG.9

SYSTEMS AND METHODS FOR CROSS-GAME PROGRESSIVE JACKPOT DETERMINATION BASED UPON WAGER AMOUNT

CROSS-REFERENCE TO RELATED APPLICATION

This application is a continuation of and claims priority to U.S. patent application Ser. No. 17/930,701, filed Sep. 8, 2022, which is a continuation of U.S. patent application Ser. No. 17/333,967, now U.S. Pat. No. 11,443,595, filed May 28, 2021, which is a continuation of U.S. patent application Ser. No. 16/507,934, now U.S. Pat. No. 11,024,121, filed Jul. 10, 2019, the contents and disclosures of which are incorporated by reference herein in their entireties.

TECHNICAL FIELD

The field of disclosure relates generally to electronic gaming, and more particularly, to systems and methods for Class II electronic gaming, in which a progressive jackpot determination, and player eligibility for a progressive jackpot determination, are based, at least partially, upon wager amount.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an electronic gaming system is provided. The electronic gaming system includes a memory device and a processor configured to execute instructions stored in the memory device, which when executed, cause the processor to at least receive a wager and a bingo card parameter from an electronic gaming machine (EGM) that is communicatively coupled to the electronic gaming system. The instructions may also cause the processor to determine, based upon the wager amount, a subset of a plurality of bingo card parameters, and compare the received bingo card parameter to the subset of the plurality of bingo card parameters to determine whether the received bingo card parameter matches any bingo card parameter of the subset of the plurality of bingo card parameters, where each bingo card parameter of the subset of the plurality of bingo card parameters is associated with a progressive jackpot. In addition, the instructions may cause the processor to award the progressive jackpot to a player of the EGM in response to determining that the received bingo card parameter matches a bingo card parameter of the subset of the plurality of bingo card parameters.

In another aspect, an electronic gaming machine (EGM) is provided. The EGM includes a memory device and a processor configured to execute instructions stored in the memory device, which when executed, cause the processor to at least receive a wager amount and identify a bingo card parameter associated with a bingo card provided to a player during a base bingo game played on the EGM, and provide the identified bingo card parameter to an electronic gaming system communicatively coupled to the EGM. The electronic gaming system is configured to determine, based upon the wager amount, a subset of a plurality of bingo card parameters, and compare the identified bingo card parameter to the subset of the plurality of bingo card parameters to determine whether the identified bingo card parameter matches any bingo card parameter of the subset of the plurality of bingo card parameters, where each bingo card parameter of the subset of the plurality of bingo card parameters is associated with a progressive jackpot. The electronic gaming system may also be configured to award the progressive jackpot to the player of the EGM in response to determining that the identified bingo card parameter matches a bingo card parameter of the subset of the plurality of bingo card parameters.

In yet another aspect, a method of awarding a progressive jackpot is provided. The method includes receiving, by a processor of an electronic gaming system, a wager amount and a bingo card parameter from an electronic gaming machine (EGM) communicatively coupled to the electronic gaming system, determining, based upon the wager amount, a subset of a plurality of bingo card parameters, and comparing, by the processor, the received bingo card parameter to the subset of the plurality of bingo card parameters to determine whether the received bingo card parameter matches any bingo card parameter of the subset of the plurality of bingo card parameters, where each bingo card parameter of the subset of the plurality of bingo card parameters is associated with a progressive jackpot. The method may also include awarding, by the processor, the progressive jackpot to a player of the EGM in response to determining that the received bingo card parameter matches a bingo card parameter of the subset of the plurality of bingo card parameters.

BRIEF DESCRIPTION OF THE DRAWINGS

An example embodiment of the subject matter disclosed will now be described with reference to the accompanying drawings.

FIG. 9 shows a plurality of jackpot tables included in a database of jackpot tables as described with reference to the process of FIG. 8, in which each jackpot table includes a plurality of bingo card parameters for comparison to a bingo card parameter received from a base bingo game.

DETAILED DESCRIPTION

Embodiments of the present disclosure provide a variety of systems and methods for determining whether to award a player a progressive jackpot (or jackpots) in a cross-game or multi-game Class II environment. In such an environment, a plurality of electronic gaming machines (EGMs) may be networked to a progressive server that determines whether to provide one or more progressive jackpots to the EGMs. The EGMs may be configured to provide a variety of games, and player wagers may vary from one game to another as a result of game rules and/or configuration criteria specific to each game. To account for the availability of varying wager options, and to comply with Class II regulatory requirements, in such a cross-game environment, the progressive server may factor player wager amounts into a progressive jackpot determination.

More particularly, to accommodate a variety of games (or EGMs providing a variety of games), jackpot determinations may be scaled in proportion to player wager amounts. For example, in one embodiment, a jackpot eligibility probability may be determined based upon a player wager and evaluated in conjunction with a random number to determine whether a player is eligible to participate in a jackpot award determination. In another embodiment, a jackpot (or jackpots) may be associated with one or more jackpot tables, which may specify winning bingo card parameters, and which may be searched, all or in part, in proportion to a player wager.

Figure 1:
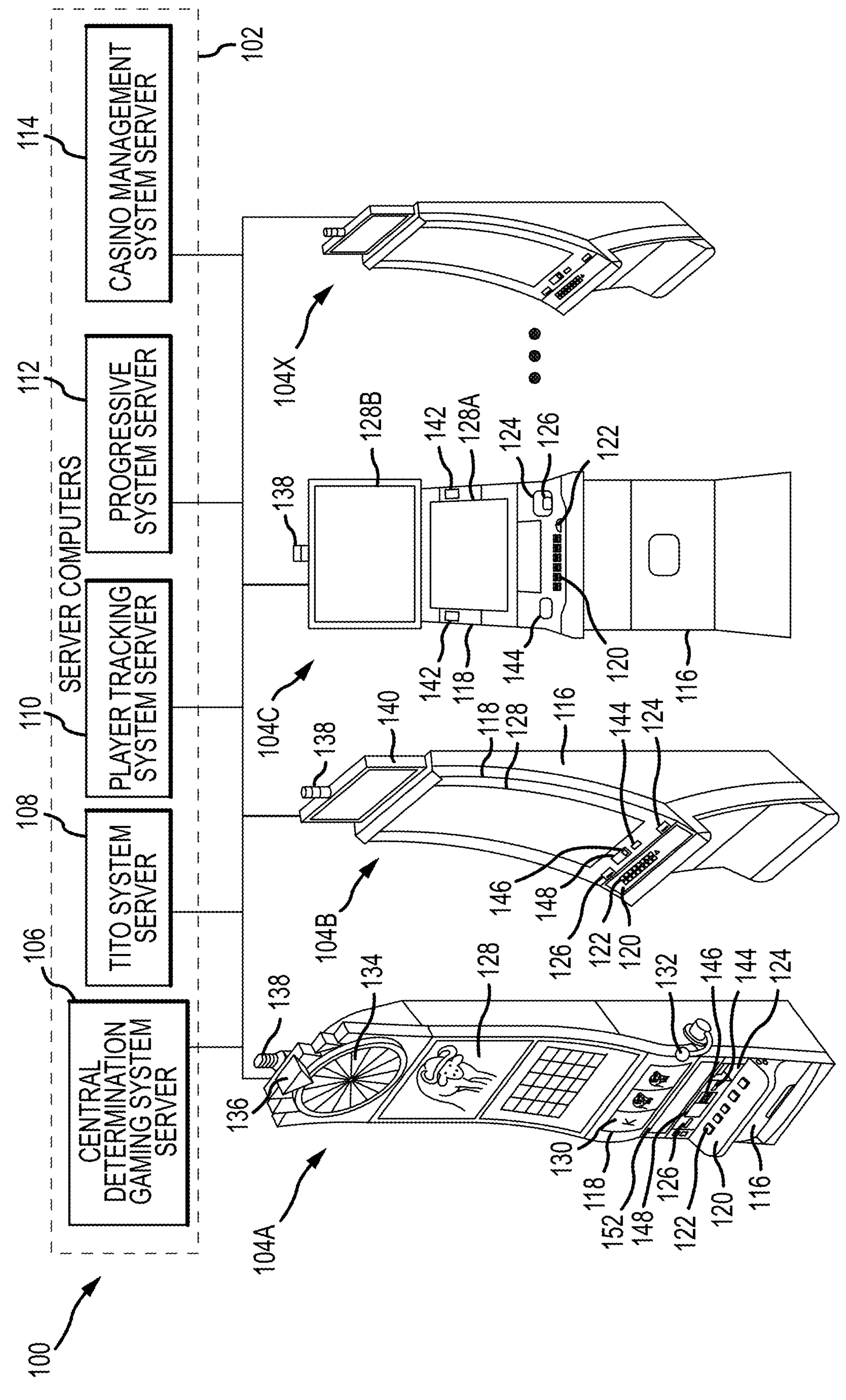
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
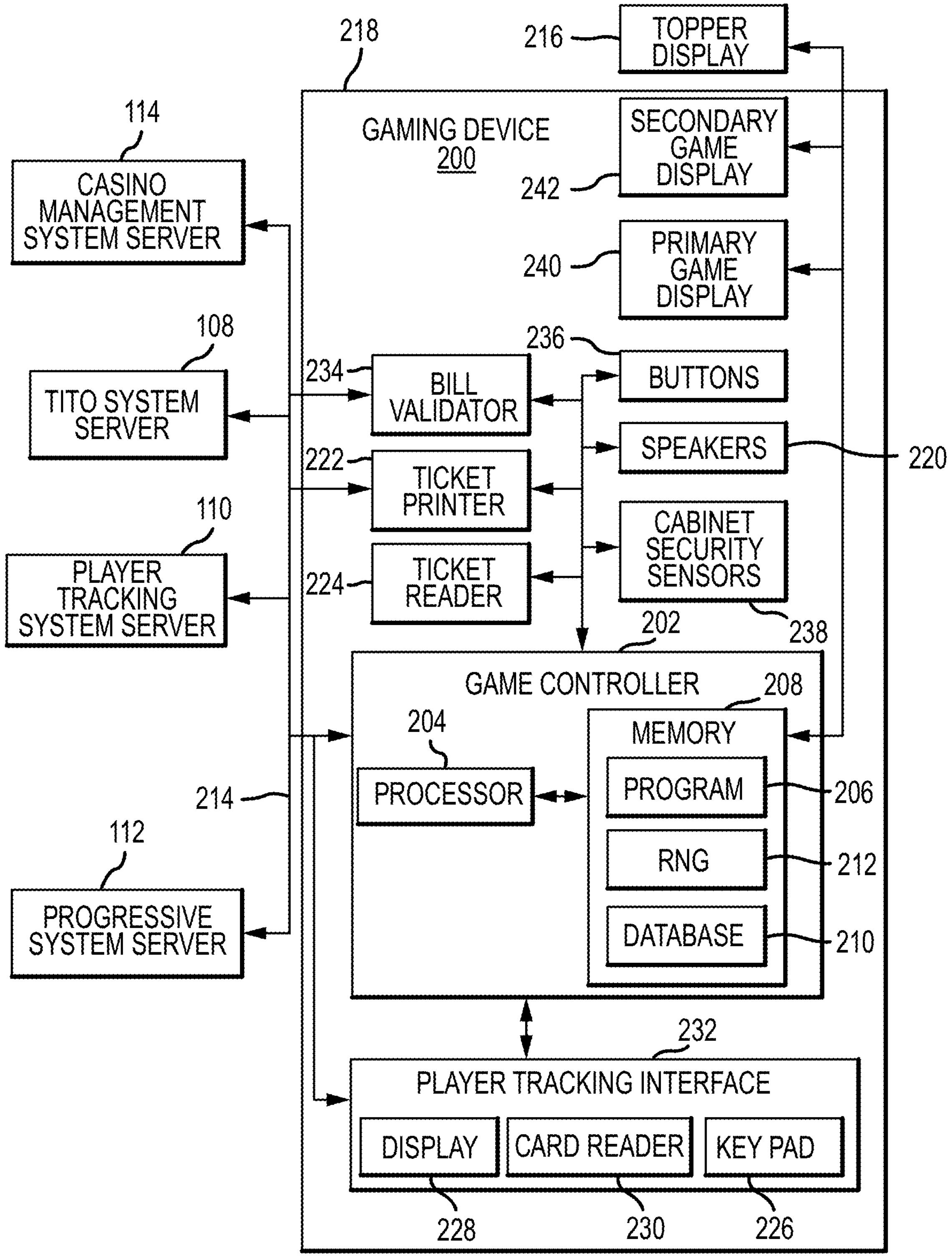
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software/progressives and provide new technology in that they facilitate a cross-game or multi-game determination whether a player may be eligible to participate in a progressive award determination and/or whether to award a progressive jackpot. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
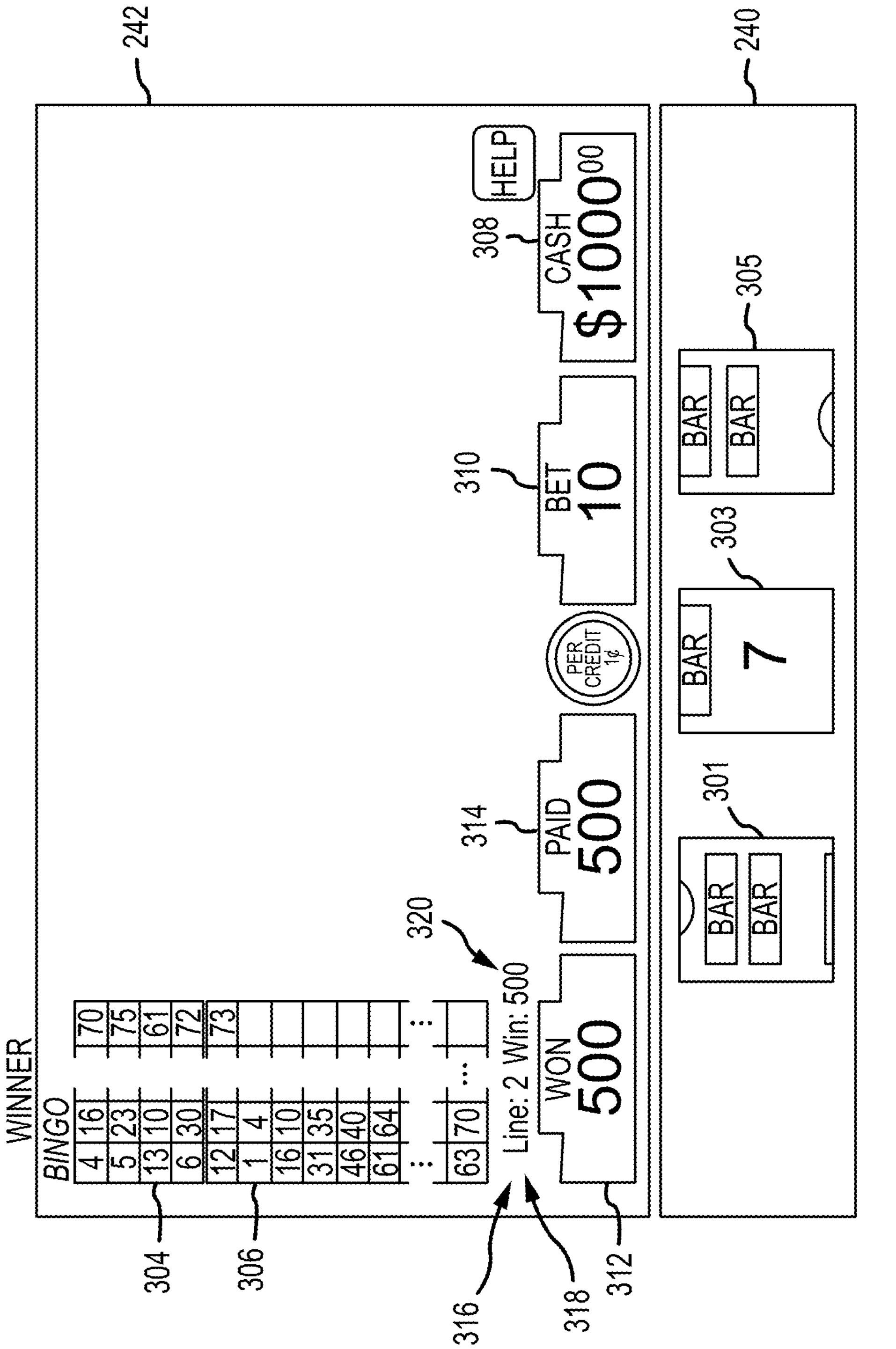
FIG. 3 is a screenshot of an example Class II bingo game being displayed on an EGM as shown in FIG. 1.

FIG. 3 depicts an example of a Class II bingo game being displayed in the primary game display 240 and secondary game display 242 of the EGM 200 of FIG. 2. In the example of FIG. 3, a plurality of reels 301, 303, and 305 are displayed within the primary game display 240. While only three reels 301, 303, 305 are shown in the example of FIG. 3, in some examples, more or fewer reels may be used. In some examples, the reels 301, 303, and/or 305 may be implemented as mechanical reels or may include virtual reels that are computer generated and display one a computer display screen. As shown, each reel 301, 303, 305 has a plurality of symbol display positions for presenting symbols (and/or symbol combinations) which may be associated with winning and/or losing reel game outcomes and/or awards.

In the example of FIG. 3, a bingo card 304 and a bingo number listing 306 are displayed in the secondary game display 242. As shown, the bingo card 304 comprises a matrix of bingo cells 302 (e.g., squares). In some examples, the matrix may be a 5×5 matrix of 25 total cells. In some examples, the bingo card 304 may have a matrix of a different size (e.g., 3×3, 4×4, 4×5, 4×6, 6×6, 7×7, 3×8, 10×10, etc.). In some examples, the matrix may be larger or smaller. In the example of FIG. 3, each cell 302 in the matrix of the bingo card 304 includes a number that is not repeated in any other cell of the bingo card 304.

In the example of FIG. 3, the secondary game display 242 further displays a credit meter 308 showing an amount of money and/or credits (e.g., credit balance) held by a player of the EGM 200. In the example of FIG. 3, the credit balance 308 shows $1000. The secondary display 242 additionally shows a wager meter 310 adjacent to the credit meter 308, under "BET." In the example of FIG. 3, the amount wagered is 10 credits (e.g., $0.10). The amount wagered (e.g., via the user interface) may be deducted from the credit meter 308. The secondary game display 242 additionally displays a win meter 312 and a total win meter 314. In the example of FIG. 3, the win meter 312 is 500, indicating that the simulated combination of symbols in reels 301, 303, 305 is associated with a 500 award (which is equal to the awards associated with the bingo game outcome). As shown, the total win meter 314 is also 500, indicating that the cumulative total of awards received comprises just that one 500 credit award. In the example of FIG. 3, the secondary game display 242 further displays reel win information 316. The reel win information 316 includes win line information 318 and award information 320. The win line information 318 indicates which win line in the reels 301, 303, 305 contains symbols comprising a winning reel game outcome. The award information 320 indicates an associated award amount for that winning reel game outcome.

In some examples, the bingo game may be a networked game that involves two or more networked EGMs 200, such as EGMs 104A-104X. For example, many electronic bingo games may be required, by state gaming regulations, to include at least two players. As a result, in these circumstances, a bingo game can only occur if two or more players have placed wagers and received a bingo card to be used to determine a game outcome against a common ball call. As described in additional detail herein, a ball call is initiated once at least two players have joined an electronic bingo game (e.g., a networked electronic bingo game), and each player's bingo card (or cards) are compared to the same ball call, even where the players are physically separated, such as in different parts of a casino or even in different casinos.

The central determination gaming system server 106 may manage (and/or host) the bingo game, such as by generating the bingo card 304 (or cards, as above) and/or bingo number listing 306. In some examples, the bingo card 304 (and/or information on which the bingo card 304 is based), and/or the bingo number listing 306 may be generated using an RNG. In some examples, the bingo card 304 may be randomly selected from a set of bingo cards or a player may select their own bingo card 304 (e.g., via the user interface), such as from a set of randomly generated bingo cards, for example.

In operation, a player and/or EGM 200 may be provided with a respective bingo card 304, such as by central determination gaming system server 106. For example, a player may be provided a new bingo card 304 each time a "Spin" or "Play" button is pressed by the player (e.g., via user interface), provided the player has made a wager. In some examples, more than one bingo card 304 may be generated in response to a wager. The bingo number listing 306 (e.g., "ball call") may be randomly generated, such as by central determination gaming system server 106. The bingo card 304 may be compared to the current bingo number listing 306, and numbered cells 302 on the bingo card 304 that match numbers in the bingo number listing 306 may be marked or "daubed" on the bingo card 304. Finally, the marked or daubed bingo card 304 may be evaluated against a paytable of winning bingo patterns.

The bingo number listing 306 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 306. Other game-ending patterns are also possible. When the game-ending pattern is awarded, the bingo number listing 306 is reset, for all players participating in the bingo game and the process repeats. In some examples, a single play of the bingo game includes a wager, a bingo card, a bingo number listing 306, a matching of the numbers called with those on a bingo card 304, a determination of a bingo game outcome, and a presentation of an associated award, if any.

A bingo game outcome may be determined by comparing one or more patterns of marked (and/or "daubed) cells of the bingo card 304 with the paytable of winning bingo patterns. If the bingo card 304 does not include a pattern that matches a pattern in the paytable of winning patterns, then a losing bingo outcome is determined, and no award may be provided to the player. If the bingo card 304 does include a pattern that matches a pattern in the paytable of winning patterns, then a winning bingo outcome is determined, and a reward may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the bingo card 304 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 304 for multiple plays of the bingo game, with a new bingo number listing 306 generated for each play of the bingo game. Other methods of play of a Class II bingo game are also possible and are within the scope of this disclosure.

The bingo game outcome may be presented to the player via a spinning reel game simulation. In the example of FIG. 3, the spinning reel game is simulated via the plurality of reels 301, 303 and 305 in the primary game display 240. For each play of the bingo game, the bingo game outcome is presented as a reel spin outcome in the reel game. In some examples, the spinning reel game simulation may operate by spinning each reel 301, 303, 305 and then stopping each reel 301, 303, 305 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 301, 303 and 305. Similarly, a losing bingo game outcome may be displayed as a losing combination of reels 301, 303 and 305. Different outcomes of the bingo game may be displayed as different outcomes in the spinning reel game. Thus, the bingo game outcome is presented to the player as a particular reel spin outcome of reels 301, 303 and 305.

Figure 4:
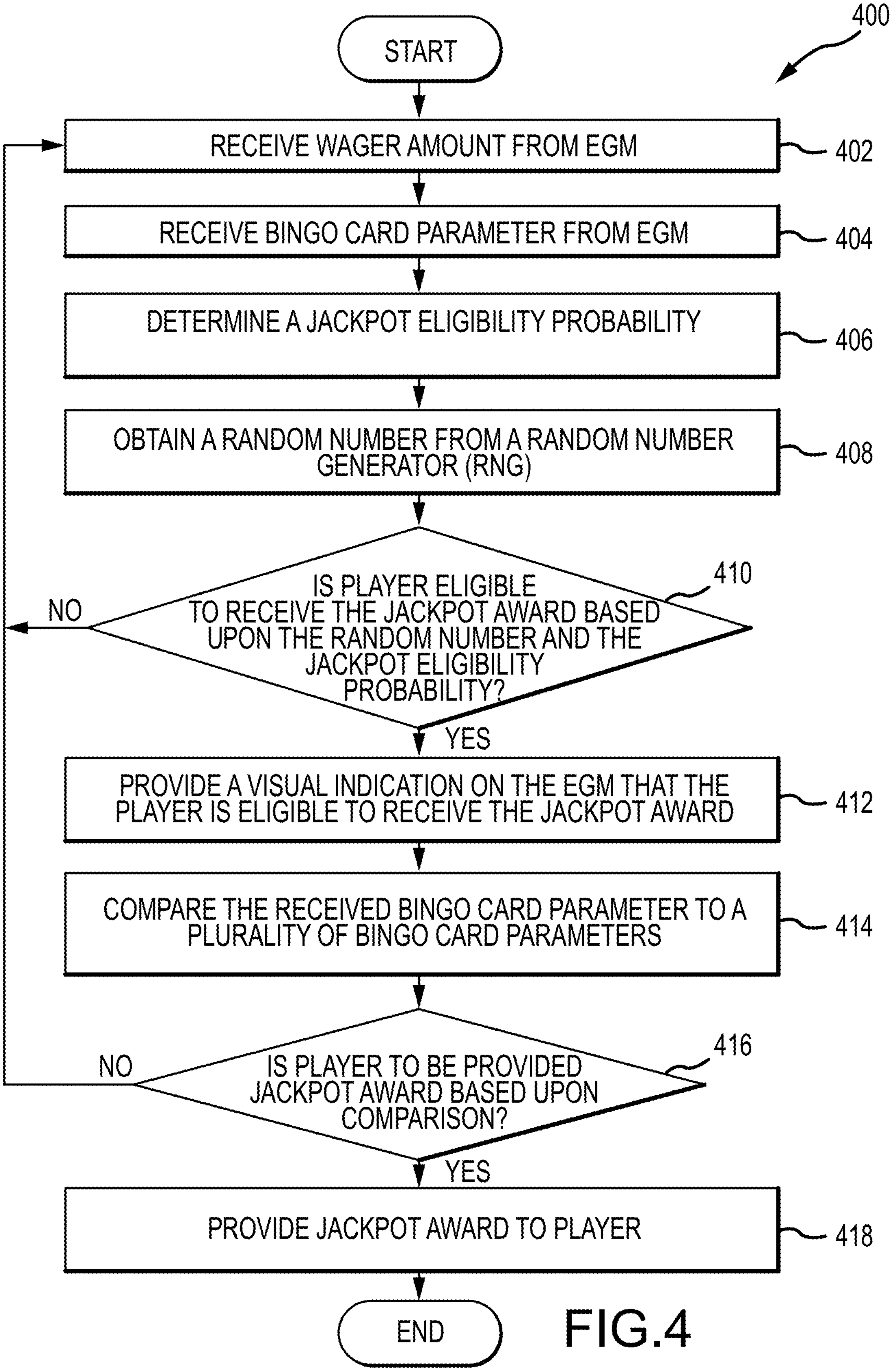
FIG. 4 is a flowchart illustrating a first process for awarding a progressive jackpot, in which a jackpot eligibility probability is controlled, at least partially, by a wager amount.

FIG. 4 is a flowchart illustrating a first process 400 for awarding a progressive jackpot in a Class II bingo game, in which a jackpot eligibility probability is controlled, at least partially, based upon a wager amount. As described herein, process 400 may be implemented, all or in part, on a backend electronic gaming system (e.g., a server system, such as central determination gaming system server 106 and/or progressive system server 112) with a variety of networked EGMs 104A-104X to accommodate a variety of games having differing minimum, maximum, and intermediate wager amounts (or bets) available.

For example, a first game played on a first EGM 104A may specify a minimum bet of five cents and a maximum bet of one dollar, while a second EGM 104B may specify a minimum bet of one dollar and a maximum bet of five dollars. Process 400 may determine a jackpot eligibility probability in association with both games, irrespective of their differing minimum and maximum bet values, to achieve a desired return to player (RTP) in both games. Thus, process 400 may be regarded as a "cross-game" or "multi-game" process for awarding a jackpot (or jackpots), in that process 400 may be implemented on a backend system, such as any of servers 106-114, in conjunction with a plurality of EGMs 104A-104X providing a plurality of different games, where each may specify different (and/or identical) minimum and maximum bets. At least one technical improvement embodied by the present systems and methods is therefore that a jackpot determination may be performed, using the systems and methods described herein, for a variety of games played on a variety of EGMs 104A-104X, even, as described in additional detail herein, where one or more games are different denomination games and permit wagers in different ranges of denominations. For instance, as described below, a dynamically scalable jackpot eligibility probability may be used to maintain and control a desired return to player across a wide variety of games, even though the games may permit different denomination wagers or different denomination ranges.

As used herein, an "award eligibility probability" or "jackpot eligibility probability" may refer to a probability or chance that a player is eligible, based on any given wager, to participate in (or be awarded) an award, such as, for example, a progressive jackpot. As described in greater detail herein, a determination whether to award a progressive jackpot may be made following a determination that a player is eligible to be awarded the jackpot. In other words, a determination that a player is eligible to be awarded a jackpot is separate from a determination (usually later in time) whether to award the player a jackpot. In addition, the phrases "eligible to be awarded" and "eligible to participate in" may be used interchangeably and simply refer to eligibility of a player to be provided a progressive jackpot if other conditions are also satisfied.

Accordingly, in at least some embodiments, an electronic gaming system, such as central determination gaming system server 106 and/or progressive system server 112, may receive a wager amount from an EGM 104A-104X to which the electronic gaming system is communicatively coupled (e.g., via a computing network) (step 402). The wager amount may be provided from a Class II base bingo game played on the EGM 104A-104X, such as, for example, in response to selection by a player of a "Spin" or "Bet" button. Thus, the electronic gaming system may receive data indicative of a wager amount from an EGM 104A-104X each time a player selects a "Spin" or "Bet" option from an EGM 104A-104X. In addition to receiving the wager amount, the electronic gaming system (or the player's EGM 104A-104X) may either determine an outcome of the bingo game based upon a marked or "daubed" bingo card of the player, or receive an outcome of the bingo game from EGM 104A-104X, as described herein (e.g., with reference to FIG. 3).

In addition to a wager amount, the electronic gaming system may also receive a bingo card parameter from an EGM 104A-104X (step 404). As used herein, a "bingo card parameter" may include any information that identifies or is associated with a bingo card in a base bingo game (e.g., a base game bingo card). For example, in some embodiments, a bingo card parameter may include a unique bingo card identifier, such as a numerical, alphabetical, or alphanumerical identifier. In other embodiments, a bingo card parameter may include a bingo pattern, as described herein, such as a pattern daubed or marked on a bingo card based upon a randomly determined ball call in a base bingo game. An example bingo card parameter including a marked or daubed bingo card 304 is generally illustrated in FIG. 3, where bingo card 304 may be regarded as the bingo card parameter. In some cases, bingo card 304 is marked or daubed, and in other cases, no marking or daubing has occurred. In both cases, bingo card 304 may represent at least one type of bingo card parameter, as used and described herein.

In response to receiving a wager amount, the electronic gaming system may determine a jackpot eligibility probability (step 406). As described herein, a jackpot eligibility probability may specify a probability or chance that a player is eligible to receive a jackpot award (or participate in a jackpot award determination). The jackpot eligibility probability may, in addition, precede a determination whether a player is to be actually awarded a jackpot. That is, the electronic gaming system may only determine whether to provide a jackpot award to a player if the system first determines, based upon the jackpot eligibility probability, that the player is eligible to receive the jackpot award.

To determine a jackpot eligibility probability, the electronic gaming system may calculate a ratio, or ratio percentage, of the wager amount received from EGM 104A-104X and a maximum wager amount, which may be predefined in a computer memory of the electronic gaming system and established based upon regulatory requirements, a desired RTP in the cross-game process 400, and/or any other necessary or suitable criteria. In at least some embodiments, jackpot eligibility probability is set equal or proportional to the determined ratio percentage. For example, a ratio percentage of 20% for a given wager may result in a jackpot eligibility probability of 20% for the same wager. Likewise, a ratio percentage of 70% may result in a jackpot eligibility probability for a given wager of 70%. Thus, a jackpot eligibility probability may dynamically increase and decrease for each player wager in proportion to the wager amount, where larger wagers cause the jackpot eligibility probability to increase, and smaller wagers cause the jackpot eligibility probability to decrease.

Stated another way, a jackpot eligibility probability may be dynamically scaled in proportion to a wager amount as the wager amount changes from one EGM 104A-104X to another or as a player changes or alters his or her wager amount from bet to bet on a single EGM 104A-104X. While the jackpot eligibility probability is scaled proportional to the wager amount, it may also be normalized. As used herein, a jackpot eligibility probability may be "normalized" based upon a wager amount by non-linearly (or non-proportionally) scaling the jackpot eligibility probability based upon the wager amount. In one embodiment, a jackpot eligibility may be normalized to scale by a first scale factor for a first range of (lesser or smaller) wagers, and a second, larger, scale factor for a second range of (greater or larger) wagers.

As a result, process 400 may work to accommodate a variety of Class II games played on many different EGMs 104A-104X, even where each game may specify a different range of available wager amounts. More particularly, even though, as described above, jurisdictional requirements may specify that a Class II game be commonly played by at least two players (using the same ball call and different bingo cards), the dynamically scalable nature of the jackpot eligibility probability may be used to maintain a desired RTP across a wide variety of games, even though the games may not be consistent in the wager amounts they permit players to specify. Stated another way, in addition other improvements noted throughout, the systems and methods described herein embody one specific improvement in the technical field of Class II electronic gaming, in that the systems and methods may be used to determine whether to provide a jackpot award to multiple players in association with multiple Class II games, which may be the same game type or different game types (with different winning outcomes, awards, and/or probabilities) and/or a single Class II game participated in by multiple players, irrespective of their differing minimum and maximum bet values, to achieve a desired return to player (RTP) in each of, or "across," the multiple games and/or single game having multiple players, while using, in various circumstances, one or more shared ball call(s).

In at least some embodiments, a random number may also be obtained from a random number generator, such as RNG 212, and/or a random number generator that is part of or included in the electronic gaming system (e.g., a RNG that is included in any of servers 106-114) (step 408). More particularly, a jackpot eligibility probability may be used in conjunction with a random number to determine whether a player is eligible to receive a jackpot award in response to any given wager in a base bingo game. For example, in response to determining a jackpot eligibility probability (or in some cases prior to determining the jackpot eligibility probability), the electronic gaming system may obtain a random number from a random number generator.

The random number generator may be programmed to generate a random number from a range of random numbers, and the electronic gaming system may obtain or "pull" a random number from the random number generator in response to each player wager in the base bingo game. In other embodiments, however, the electronic gaming system may not pull a random number in response to each and every player wager. As a result, in various embodiments, the electronic gaming system may determine a jackpot eligibility probability in response to each player wager or, in other cases, only in response to a trigger condition occurring (e.g., a game ending win).

Accordingly, to determine whether a player is eligible to participate in a jackpot determination, the electronic gaming system may dynamically determine or select (e.g., each time a wager amount is received, and as described herein, based upon the wager amount), a sub-range of random numbers from the range of random numbers that the random number generator is programmed to generate. For example, if the random number is programmed to generate random numbers between one and one-hundred, the electronic gaming system may dynamically select the sub-range from the range of one to one-hundred numbers. Here, a small range is used for clarity and only to illustrate. It will be appreciated that many embodiments may use a larger range of numbers, such as numbers from one to ten-thousand or from one to one-hundred-thousand.

Specifically, in at least some embodiments, the sub-range of random numbers may be selected in proportion to the jackpot eligibility probability. For example, if the whole range of random numbers is one to one-hundred, and the determined jackpot eligibility is 70% for a given wager, the electronic gaming system may select a sub-range of one to seventy (i.e., 70% of 100) for use in determining jackpot eligibility in association with the wager. As a result, the sub-range of random numbers is also determined in proportion to a player wager (which, as described above, controls the jackpot eligibility probability), such that the sub-range of random numbers is dynamically increased and decreased by the electronic gaming system in proportion to each player wager.

Figure 5:
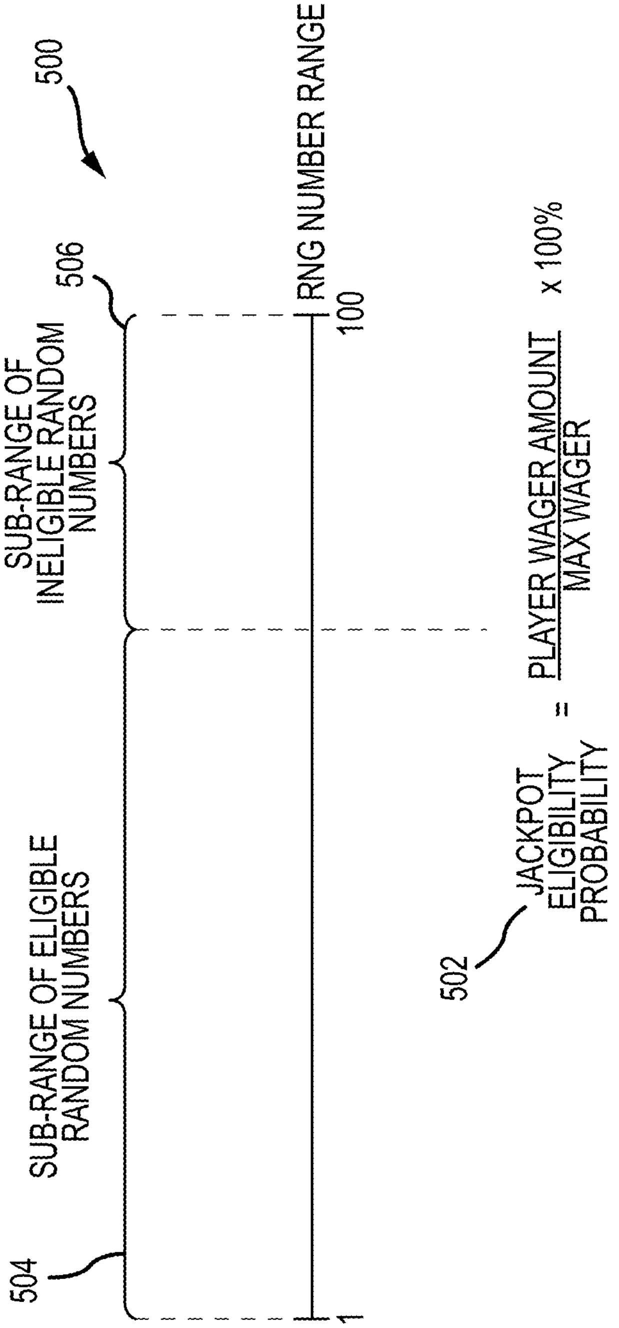
FIG. 5 is a number line graphically illustrating relationship between jackpot eligibility probability and wager amount, as described with reference to the process of FIG. 4.

FIG. 5 is a number line 500 graphically illustrating the relationship between jackpot eligibility probability and wager amount (as described above with reference to FIG. 4). As shown, number line 500 ranges, in this example, from one to one-hundred. A jackpot eligibility probability 502 is determined, as described above, from a wager amount and a maximum wager. Also as described above, the determined jackpot eligibility probability controls a sub-range of number line 500 selected by the electronic gaming system. Specifically, a sub-range of eligible random numbers 504 are selected using the jackpot eligibility probability 502 in proportion to the jackpot eligibility probability. The portion of number line 500 outside sub-range of eligible random numbers 504 are classified as a sub-range of ineligible random numbers 506. Thus, a player's wager amount controls a portion of number line 500 (or the range of random numbers included on number line 500) portioned into sub-range of eligible random numbers 504. Specifically, sub-range of eligible random numbers 504 increases and decreases in proportion to each player wager through the ratio relationship between player wager amount and jackpot eligibility probability.

As further described in FIG. 4, the electronic gaming system may compare the random number obtained from the random number generator to sub-range of eligible random numbers 504 to determine whether the player is eligible, for a given wager or bet in the base bingo game, to receive a jackpot award (step 410). More particularly, the electronic gaming system may determine whether the random number obtained from the random number generator is included in sub-range of eligible random numbers 504.

If the random number obtained is included in sub-range of eligible random numbers 504, the electronic gaming system may determine that the player is eligible to receive a jackpot award for a given wager (or stated another way, the electronic gaming system may determine that the player is eligible to participate in a jackpot award determination). On the other hand, if the random number obtained is outside sub-range of eligible random numbers 504 (i.e., within sub-range of ineligible random numbers 506), the electronic gaming system may determine that the player is not eligible to receive a jackpot award for a given wager. Again, this eligibility determination may be performed, in at least some embodiments, each time a player places a wager, which as described above, may also be accompanied by a second card or transformed base game bingo card. That is, a new or different base game bingo card (or progressive jackpot bingo evaluation card) may also be provided in response to each new wager.

In response to a determination that a player is eligible to receive a jackpot award (or participate in a jackpot award determination), the electronic gaming system may provide a control instruction to the player's EGM 104A-104X that causes the player's EGM 104A-104X to provide a visual indicator that the player is eligible to participate in a jackpot award determination (step 412). For example, in at least one embodiment, the control instruction may cause the player's EGM 104A-104X to change a color of the base game bingo card displayed by the player's EGM 104A-104X (as described herein) from a first color to a second color. In one embodiment, the first color is blue or gray, and the second color is gold. Thus, in at least one embodiment, a player's base game bingo card may be turned into a "gold card" in response to a determination that the player is eligible to receive a jackpot award. As a result, player excitement and anticipation may increase (e.g., a player may get excited when his or her base game bingo card turns into a "gold card," as the player may understand that he or she is eligible to participate in a jackpot determination when this condition occurs).

Figure 6:
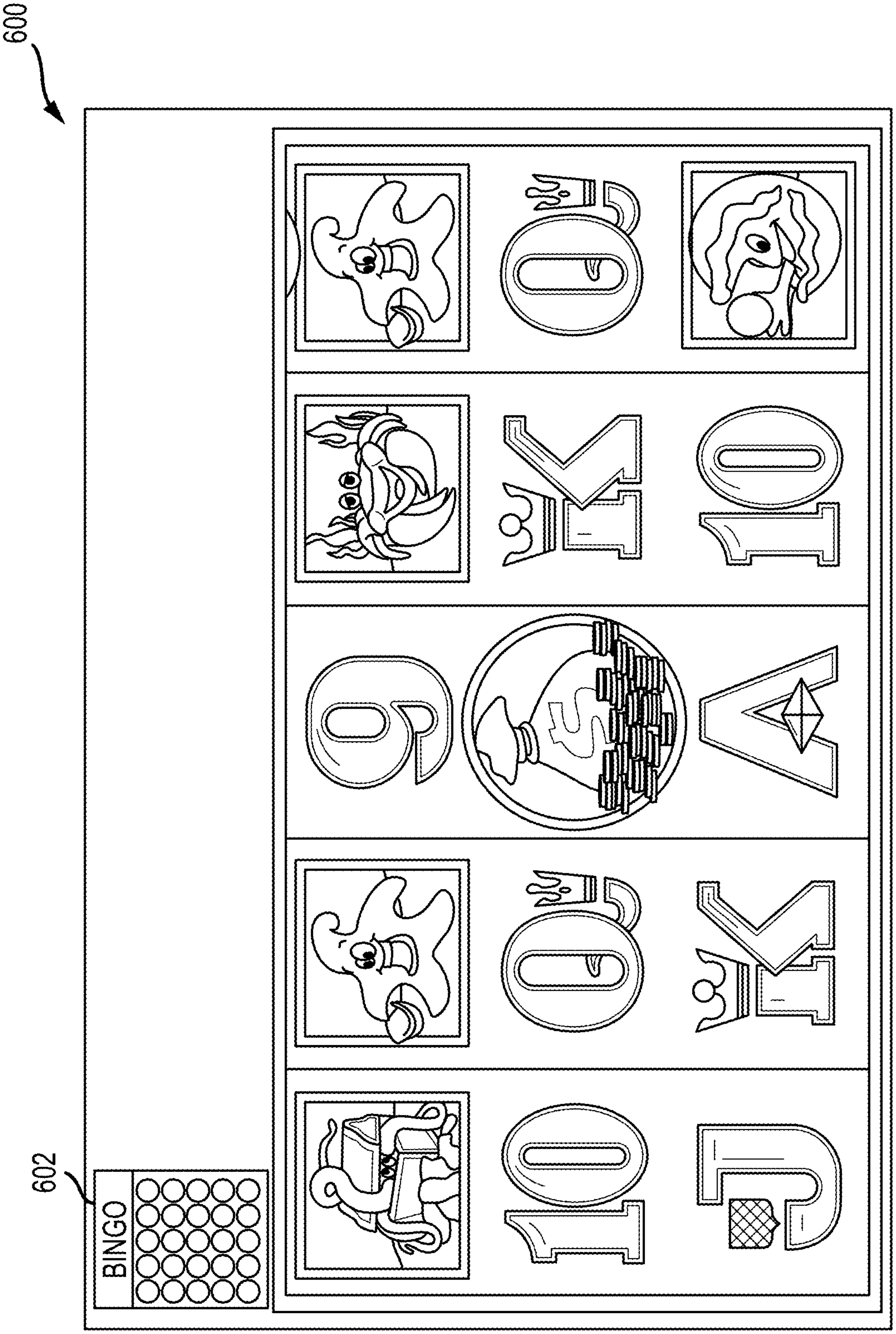
FIG. 6 is a first screenshot showing a reel-based bingo game, in which a base bingo card is depicted, and in which the base bingo card is not visually altered, indicating that a player is not eligible, based upon a jackpot eligibility probability, to receive a jackpot award.
Figure 7:
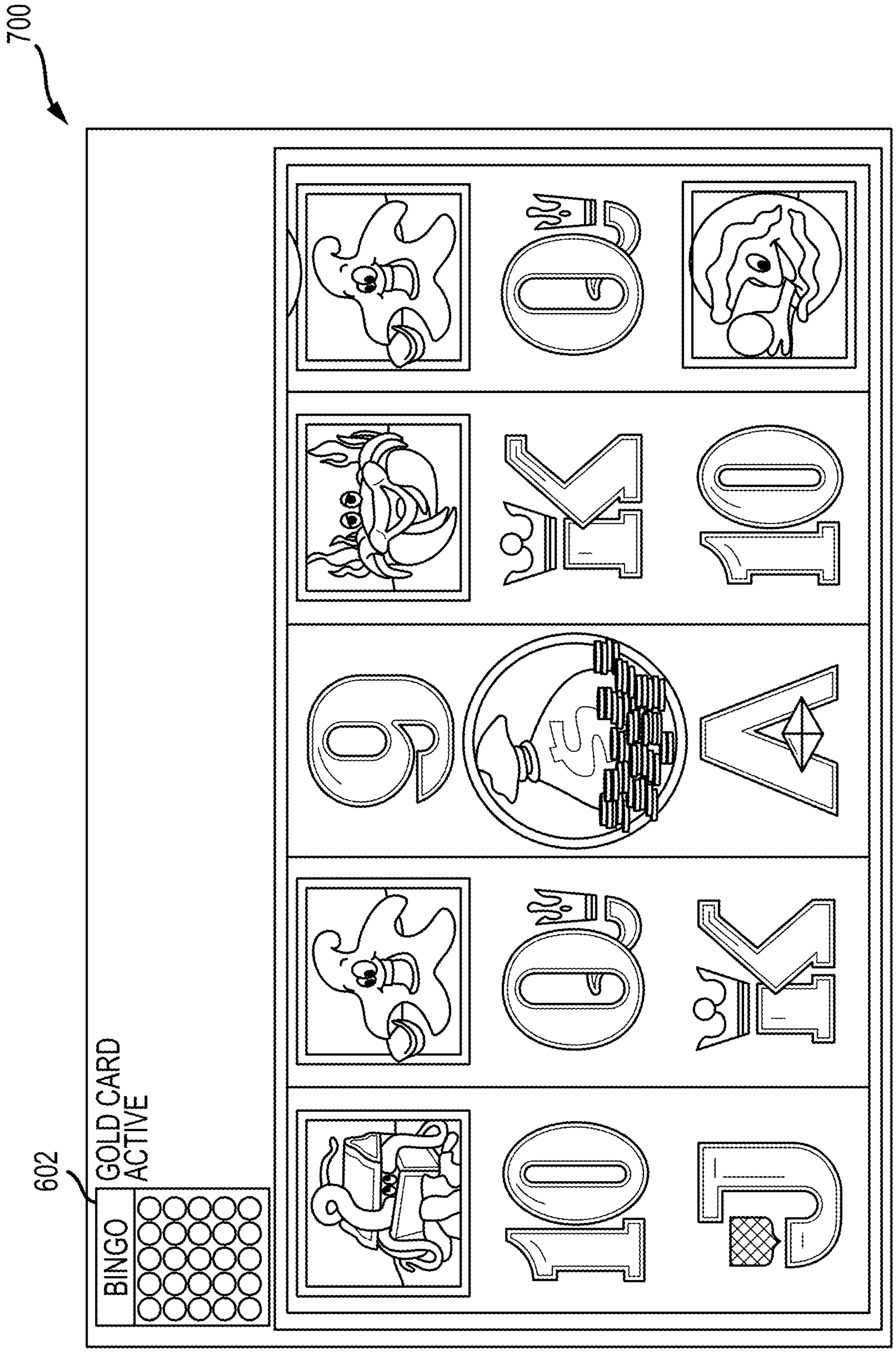
FIG. 7 is a second screenshot showing the reel-based bingo game of FIG. 6, in which a base bingo card is depicted, and in which the base bingo card is visually altered, indicating that a player is eligible, based upon a jackpot eligibility probability, to receive a jackpot award.

Screenshots showing a transition from a gray or blue base game bingo card to a "gold card" in response to determining that a player is eligible to participate in a jackpot award determination are shown with reference to FIG. 6 and FIG. 7. Specifically, FIG. 6 is a first screenshot 600 showing a reel-based bingo game, in which a base bingo card 602 is depicted, and in which base bingo card 602 is not visually altered, indicating that a player is not eligible, based upon a jackpot eligibility probability, to receive a jackpot award. Likewise, FIG. 7 is a second screenshot 700 showing the reel-based bingo game of FIG. 6, in which the base bingo card 602 is depicted, and in which base bingo card 602 is visually altered, indicating that the player is eligible, based upon a jackpot eligibility probability, to receive a jackpot award. Specifically, as described above, in FIG. 6, the base bingo card 602 is blue or gray, while in FIG. 7, the base bingo card 602 is visually altered to appear as a "gold card."

Returning again to FIG. 4, in response to a determination that a player is eligible to receive a jackpot award, the electronic gaming system may determine whether to award a jackpot (e.g., of a tiered plurality of jackpots in the case of a multi-level progressive) to the player. Specifically, the electronic gaming system may determine whether to provide a jackpot award to a player based upon a comparison of the received bingo card parameter (e.g., a marked or daubed bingo pattern of the base game bingo card) to a jackpot paytable of winning bingo card parameters, where the jackpot paytable of winning bingo card parameters may, for example, associate a plurality of bingo card parameters (e.g., bingo patterns) with a winning jackpot outcome (e.g., a particular jackpot award or a plurality of jackpot awards) (steps 414 and 416) (see FIG. 3 and accompanying description for additional detail on bingo card evaluation).

If the received bingo card parameter matches at least one bingo card parameter of the jackpot paytable, the electronic gaming system may provide the associated jackpot to the player, such as by adding a value of the jackpot to a credit balance of the player and decrementing or decreasing the jackpot by the value provided to the player or back to a fixed or otherwise determined reset amount (step 418). On the other hand, if the received bingo card parameter does not match any bingo card parameter of the jackpot paytable of winning bingo card parameters, the electronic gaming system may determine not to award any jackpot to the player.

Figure 8:
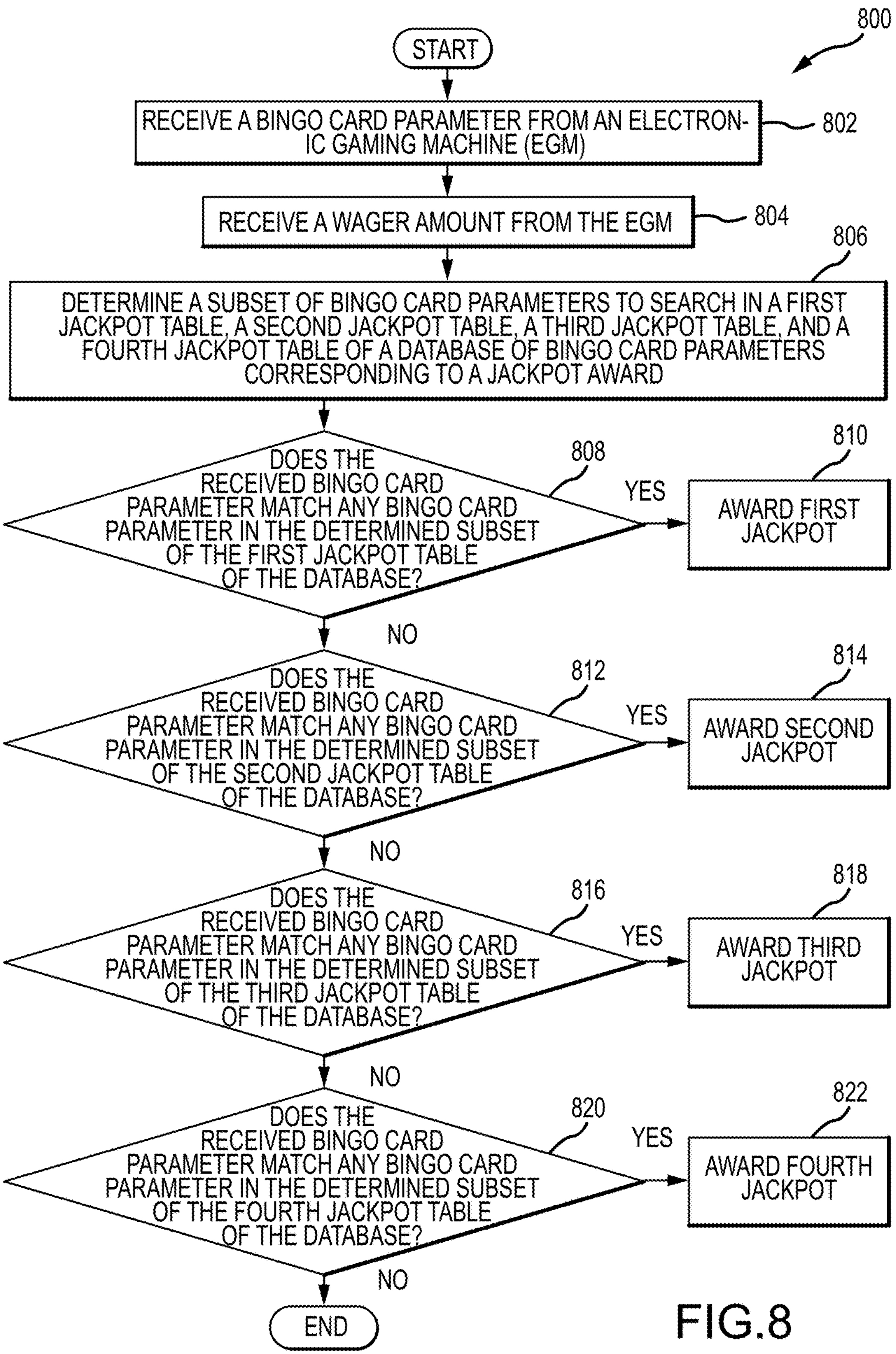
FIG. 8 is a flowchart illustrating a second process for awarding a progressive jackpot, in which a probability of awarding a jackpot is controlled, at least partially, by a wager amount.

FIG. 8 is a flowchart illustrating a second embodiment of a process 800 for awarding a progressive jackpot in a Class II bingo game, in which a probability of awarding a jackpot is controlled, at least partially, by a wager amount. In this embodiment, a jackpot eligibility probability may not be calculated. Rather, as described below, a bingo card parameter (such as a bingo pattern or bingo card identifier) may be searched in a customized database of bingo card parameters to determine whether to award a jackpot (e.g., a progressive jackpot) to a player. It will be appreciated, however, that the embodiments described herein may be variously combined with one another to achieve varying results.

The embodiment described with reference to FIG. 8 and FIG. 9 may, like other embodiments described herein, also achieve scalability across a variety of games implemented or played on differing EGMs 104A-104X. Specifically, process 800 may, like process 400, also be implemented, at least partially, on a backend electronic gaming system, such as progressive system server 112, with a variety of networked EGMs 104A-104X to accommodate a variety of games having differing minimum, maximum, and intermediate wager amounts (or bets) available.

For example, a first game played on a first EGM 104A may specify a minimum bet of five cents and a maximum bet of one dollar, while a second EGM 104B may specify a minimum bet of one dollar and a maximum bet of five dollars. Process 800 may be used to determine whether to provide a jackpot award to players in association with both games, irrespective of their differing minimum and maximum bet values, to achieve a desired return to player (RTP) in both games. Thus, process 800 may be regarded a "cross-game" process for awarding a jackpot (or jackpots) to a plurality of players. In the example provided below, four progressive jackpots are described. However, it will be appreciated that process 800 may apply to any number of jackpots, including, in some cases, a single jackpot.

Accordingly, in at least some embodiments, the electronic gaming system (e.g., any of servers 106-114, such as, for example, progressive system server 112) may receive a bingo card parameter from an EGM 104A-104X to which the electronic gaming system is communicatively coupled (e.g., via a computing network) (step 802). As described above, a "bingo card parameter" may include any information that identifies or is associated with a bingo card in a base bingo game (e.g., a base game bingo card). For example, in some embodiments, a bingo card parameter may include a unique bingo card identifier, such as a numerical, alphabetical, or alphanumerical identifier. In other embodiments, a bingo card parameter may include a bingo pattern, as described herein, such as a pattern daubed or marked on a bingo card based upon a ball call in a base bingo game.

In addition to the bingo card parameter, the electronic gaming system may also receive a wager amount from an EGM 104A-104X (step 804). The wager amount may be provided from a base bingo game played on the EGM 104A-104X, such as, for example, in response to selection by a player of a "Spin" or "Bet" button. Thus, the electronic gaming system may receive a wager amount from an EGM 104A-104X each time a player selects a "Spin" or "Bet" option from an EGM 104A-104X. In addition to receiving the wager amount, the electronic gaming system (or the player's EGM 104A-104X) may determine an outcome of the bingo game based upon a marked or "daubed" bingo card of the player, as described herein (e.g., with reference to FIG. 3).

In response to receiving a wager amount, the electronic gaming system may determine a subset of bingo card parameters to search in at least one jackpot table of a database of jackpot tables (step 806). In other embodiments, the electronic gaming system may not determine a subset of bingo card parameters to search in response to each player wager. Rather, in at least some embodiments, the electronic gaming system may determine a subset of bingo card parameters to search in response to a game ending win achieved by an EGM 104A-104X participating in the bingo game. Further, in some cases, only the EGM 104A-104X achieving the game ending win may be permitted to participate in a jackpot determination. However, in other embodiments, all EGMs 104A-104X participating in the bingo game may be permitted to participate in the jackpot determination (as described in greater detail below).

The database of jackpot tables may be customized to include (as described below with reference to FIG. 9) a jackpot table for each jackpot in a multi-tier progressive that includes a plurality of jackpots and/or any other suitable number of tables, each corresponding to a jackpot. Each table may include a plurality of bingo card parameters, such as bingo card identifiers, as described herein. Each bingo card parameter of the plurality of bingo card parameters in a table may also correspond to a winning outcome (e.g., an award of the corresponding jackpot). In other words, if a bingo card parameter associated with a bingo card provided to a player in a base bingo game matches a bingo card parameter in any of the tables, the player may be provided the corresponding jackpot award, with some exceptions and modifications for scalability across a variety of games, as described below.

In at least some embodiments, to determine a subset of bingo card parameters to search in a jackpot table of bingo card parameters, the electronic gaming system may determine a ratio (or ratio percentage) of the wager amount received from a player's EGM 104A-104X and a maximum wager. In various embodiments, the maximum wager may be a maximum wager associated with the game played by the player on the EGM 104A-104X or a maximum predefined wager stored in a memory device of the electronic gaming system. For example, if maximum wager of the game played by the player is one dollar, and the player wagers fifty cents, the determined ratio would be 0.5, and the corresponding ratio percentage would be 50% (50 cents/one dollar). In another embodiment, a maximum wager among a plurality of connected or networked EGMs 104A-104X may be used to determine a maximum wager. In one example, a maximum wager among networked EGMs 104A-104X may be twenty dollars. If a player at EGM 104A plays ten dollars and a player at EGM 104B plays one dollar, the ratio for the player at EGM 104A will be 10/20, or 0.5, while the ratio for the player at EGM 104B will be 1/20, or 0.05.

In some embodiments, the maximum wager amount can be based on the maximum wager for all EGMs 104A-104X linked to the shared progressive. Further, in some embodiments, a table (stored in memory) may specify a ratio percentage for a particular wager and jackpot. The ratio percentage specified by the table may, as described above, be a "pure ratio" percentage of a player wager divided by a maximum wager, or some other function, ratio, or percentage of a player wager. To illustrate, a first (smaller) jackpot of a multi-tier progressive may allow for a greater ratio percentage (i.e., in excess of a pure ratio, as above) at a first (e.g., lesser) bet level, whereas a second (larger) jackpot of the multi-tier progressive may not provide for any deviation from a pure ratio. Other examples are contemplated by and within the scope of the present disclosure.

Using the ratio or ratio percentage, the electronic gaming system may determine a subset of a table (or tables) to search. For instance, if the ratio percentage is 50% (or half of), the electronic gaming system may search 50% of the bingo card parameters in each jackpot table of the database. In some cases, the electronic gaming system may search a first half (starting from a top of the table), a last half (starting from a bottom of the table), and/or any other portion or subset of a table corresponding to the determined ratio percentage. For example, in some embodiments, the electronic gaming system may obtain a random number from a random number generator (as described herein) and use the random number to determine a subset of a table (or tables) to search. In one simplified case, a random number generator may be programmed to generate a random number of zero or one. If the random number is zero, a first half of one or more jackpot tables may be searched. If the random number is one, a second half of the one or more jackpot tables may be searched.

Accordingly, if there are four jackpot tables, each corresponding to one jackpot award of four independent jackpot awards, the electronic gaming system may search a first subset (e.g., a first half, a second half, etc.) of a first table, a first subset (e.g., a first half, a second half, etc.) of a second table, a first subset (e.g., a first half, a second half, etc.) of a third table, and a first subset (e.g., a first half, a second half, etc.) of a fourth table.

During the search process, in at least some embodiments, the electronic gaming system may compare the bingo card parameter (e.g., bingo card identifier) received from a player's EGM 104A-104X to the bingo card parameters in the portion of the each table to be searched. For example, in the example above, the electronic gaming system may compare the received bingo card parameter to the subset of bingo card parameters in the first table to determine whether to provide a first jackpot award associated with the first jackpot table (step 808). If the received bingo card parameter matches any bingo card parameter in the subset of the first table that is searched, the electronic gaming system may provide the associated first jackpot to the player of the EGM 104A-104X (step 810). For example, the electronic gaming system may add a value of the first jackpot to the player's credit balance, and reset the first jackpot by a preconfigured startup value.

Likewise, the electronic gaming system may compare the received bingo card parameter to the subset of bingo card parameters in the second table to determine whether to provide a second jackpot award associated with the second jackpot table (step 812). If the received bingo card parameter matches any bingo card parameter in the subset of the second table that is searched, the electronic gaming system may provide the associated second jackpot to the player of the EGM 104A-104X (step 814).

Similarly, the electronic gaming system may compare the received bingo card parameter to the subset of bingo card parameters in the third table to determine whether to provide a third jackpot award associated with the third jackpot table (step 816). If the received bingo card parameter matches any bingo card parameter in the subset of the third table that is searched, the electronic gaming system may provide the associated third jackpot to the player of the EGM 104A-104X (step 818).

In addition, the electronic gaming system may compare the received bingo card parameter to the subset of bingo card parameters in the fourth table to determine whether to provide a fourth jackpot award associated with the fourth jackpot table (step 820). If the received bingo card parameter matches any bingo card parameter in the subset of the fourth table that is searched, the electronic gaming system may provide the associated fourth jackpot to the player of the EGM 104A-104X (step 822). Although four jackpot tables are described, it will be appreciated that any suitable number of jackpot tables, corresponding to any suitable number of jackpots (including a single jackpot) may be searched in the manner described above.

FIG. 9 shows a plurality of jackpot tables included in a customized database of jackpot tables 900 as described with reference to process 800 of FIG. 8, in which each jackpot table includes a plurality of bingo card parameters for comparison to a bingo card parameter received from a base bingo game. Specifically, database 900 includes a first jackpot table 902, a second jackpot table 904, a third jackpot table 906, and a fourth jackpot table 908.

As described above, each jackpot table 902-908 is associated with a respective jackpot and includes a plurality of winning bingo card parameters. More particularly, first jackpot table 902 includes a first plurality of bingo card parameters 910, second jackpot table 904 includes a second plurality of bingo card parameters 912, third jackpot table 906 includes a third plurality of bingo card parameters 914, and fourth jackpot table 908 includes a fourth plurality of bingo card parameters 916. In the illustrated embodiment, each jackpot table 902-908 includes ten bingo card parameters 910-916. However, it will be appreciate that ten bingo card parameters are merely illustrative and that any suitable number of winning bingo card parameters may be included in each jackpot table 902-908 (e.g., typically hundreds or thousands of bingo card parameters).

In the illustrated embodiment, each bingo card parameter of the plurality of bingo card parameters 910-916 is a four digit bingo card identifier that uniquely identifies a winning bingo card for a respective or corresponding jackpot. However, in other embodiments, each bingo card parameter of the plurality of bingo card parameters 910-916 may include a different parameter or identifier (e.g., an alphabetical identifier, an alphanumeric identifier, a bingo pattern, a hash value to uniquely represent the bingo pattern, and or any other suitable parameter or identifier).

As also shown with reference to FIG. 9, one or more bingo card parameters may be common to or shared between one or more jackpot tables 902-908. For example, a first bingo card parameter 918 ("2376") may be included in first jackpot table 902 and second jackpot table 904. Likewise, a second bingo card parameter 920 ("3341") may be included in second jackpot table 904 and third jackpot table 906. Similarly, a third bingo card parameter 922 ("9843") may be included in first jackpot table 902 and fourth jackpot table 908, a fourth bingo card parameter 924 ("2585") may be included in second jackpot table 904 and fourth jackpot table 908, and a fifth bingo card parameter 926 ("5239") may be included in third jackpot table 906 and fourth jackpot table 908. These arrangements are, however, merely examples, and it will be appreciated that bingo card parameters may be shared between jackpot tables 902-908 in any desirable manner. Thus, although in some embodiments, a player may be provide a single jackpot (see FIG. 8), as described, in many embodiments, a player may receive multiple jackpots.

Accordingly, as a result of bingo card parameter sharing between one or more jackpot tables 902-908, it is possible that a player may be awarded one or more jackpot awards based upon a single bingo card parameter received by the electronic gaming system from the player's EGM 104A-104X (i.e., a single bingo card parameter corresponding to a single wager and a single selection of a "Bet" or "Spin" button). Table 1 below illustrates a variety of possibilities, where first jackpot 902 is a "Mini" jackpot, second jackpot 904 is a "Minor" jackpot, third jackpot 906 is a "Major" jackpot, and fourth jackpot 908 is a "Grand" jackpot, and where the Mini jackpot may correspond to a smallest jackpot, the Minor jackpot may correspond to a next smallest jackpot, the Major jackpot may correspond to a jackpot of greater value than the Minor jackpot, and the Grand jackpot may correspond to a largest jackpot.

TABLE 1

| |
|---|
| 1-Grand |
| 2-Major |
| 3-Minor |
| 4-Mini |
| 5-Grand + Major |
| 6-Grand + Minor |
| 7-Grand + Mini |
| 8-Major + Minor |
| 9-Major + Mini |
| 10-Minor + Mini |
| 11-Grand + Major + Minor |
| 12-Grand + Major + Mini |
| 13-Grand + Minor + Mini |
| 14-Major + Minor + Mini |
| 15-Grand + Major + Minor + Mini |

To illustrate further, in the example above, if a player's bingo card includes first bingo card parameter 918 ("2376"), the electronic gaming system might award the player the Mini and Minor jackpots (from first jackpot table 902 and second jackpot table 904). Likewise, if a player's bingo card includes third bingo card parameter 922 ("9843"), the electronic gaming system might award the player the player the Mini and Grand jackpots (from first jackpot table 902 and fourth jackpot table 908).

In some embodiments, a player may be provided greater than a single bingo card per wager (e.g., per selection of the "Spin" or "Bet" button). For example, a player may be provided five distinct bingo cards in response to each wager. In such a multi-card embodiment, any bingo card parameter of any of the player's plurality of bingo cards may be evaluated in conjunction with any of the processes (e.g., process 400 and/or process 800) described herein. For instance, in process 800, any of the five cards may be randomly selected by the player's EGM 104A-104X and/or the electronic gaming system for comparison to the one or more jackpot tables 902-908. Likewise, in some embodiments, greater than a single bingo card of a multi-card embodiment may be randomly selected and compared to one or more jackpot tables 902-908. In some multi-card embodiments, a ratio may be calculated as described above, except that the ratio (e.g., player wager/maximum wager) may be further multiplied by a fraction representing the number of bingo cards in the multi-card game. For instance, if a player wagers one dollar in a ten dollar maximum credit game, and there are five bingo cards provided to the player, the ratio may be (1/10)(1/5)=0.02.

In a related multi-card embodiment, the player's EGM 104A-104X may present a "pick" game, in which a player selects one bingo card of the player's plurality of bingo cards (or one "hide block" representing and/or obscuring a respective bingo card). When the player selects a particular bingo card (or hide block associated with and obscuring a particular bingo card), the player's EGM 104A-104X may provide the bingo card parameter associated with the player selected bingo card to the electronic gaming system for evaluation against subsets of tables 902-908, as described herein, and/or in another embodiment, for evaluation in conjunction with a jackpot eligibility probability (e.g., as described above with reference to FIG. 4). If the player selected bingo card is evaluated to provide a jackpot, the associated jackpot award may be provided to the player.

In another related multi-card embodiment, each bingo card of a plurality of bingo cards provided to a player may be evaluated against a portion of subset of a jackpot table 902-908. As a result, it is possible that a player may be provided greater than a single award of a particular jackpot if more than one of the player's bingo cards includes a bingo card parameter found in a respective subset of the jackpot table 902-908. To illustrate, an example jackpot table may contain one-thousand winning bingo card parameters. If a player is provided five bingo cards in a multi-card game, the example jackpot table may be divided into five subsets (e.g., a first subset of bingo card parameters 1-200, a second subset of bingo card parameters 201-400, and so on), and each of the five subsets of bingo card parameters may be evaluated against a bingo card parameter of a respective bingo card of the five bingo cards.

In such an embodiment, a player may receive any number of consecutive jackpot awards from a single table, such as, in this example, up to five consecutive awards of the jackpot from the example jackpot table. In addition, to offset extremely large awards, and in at least some embodiments, the total jackpot award associated with a particular jackpot table may also be subdivided or partitioned. In the example above, the jackpot table may be divided into five partitions, each associated with one-fifth of the total jackpot. As a result, a player may be provided the jackpot in fifths, one fifth for each bingo card having a bingo card parameter that matches a bingo card parameter found in a corresponding subset (e.g., subset 1-200, subset 201-400, and so on) of the corresponding jackpot table.

Embodiments of the present disclosure thus provide a variety of systems and methods for determining whether to award a player a progressive jackpot (or jackpots) in a cross-game or multi-game Class II environment. In such an environment, wagers that players are permitted to specify may vary from one game to another. In general, to accommodate a variety of games, jackpot determinations may be scaled in proportion to player wager amounts. For example, in one embodiment, a jackpot eligibility probability may be determined based upon a player wager and evaluated in conjunction with a random number to determine whether a player is eligible to participate in a jackpot award determination. In another embodiment, a jackpot (or jackpots) may be associated with one or more jackpot tables, which may specify winning bingo card parameters, and which may be searched, all or in part, in proportion to a player wager.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one memory device storing instructions and a plurality of jackpot tables associated with a plurality of jackpots, each of the plurality of jackpot tables comprising a plurality of bingo card identifiers (IDs); and at least one processor in communication with the at least one memory device, wherein the instructions, when executed by the at least one processor, cause the at least one processor to:

determine an input amount associated with an electronic game played at the electronic gaming device;

determine a plurality of bingo card parameters for the electronic game;

determine a subset of bingo card IDs from the plurality of bingo card IDs stored in the plurality of jackpot tables in the at least one memory device based at least in part upon the input amount;

determine that at least one bingo card parameter of the plurality of bingo card parameters for the electronic game matches at least one bingo card ID of the subset of bingo card IDs; and based upon the at least one bingo card parameter for the electronic game matching the at least one bingo card ID, cause at least one jackpot of the plurality of jackpots to be outputted, wherein the at least one jackpot is associated with at least one jackpot table of the plurality of jackpot tables that comprises the at least one bingo card ID.

2. The electronic gaming device of claim 1, wherein the instructions further cause the at least one processor to cause the at least one jackpot to be outputted to a player account associated with a player playing the electronic game at the electronic gaming device.

3. The electronic gaming device of claim 1, wherein the instructions further cause the at least one processor to determine the subset of bingo card IDs, wherein one or more of the subset of bingo card IDs are stored in more than one of the plurality of jackpot tables.

4. The electronic gaming device of claim 3, wherein the instructions further cause the at least one processor to cause the at least one jackpot to be outputted, wherein the at least one of the bingo card IDs is stored in more than one of the plurality of jackpot tables, and wherein at least one output amount comprises a sum of jackpots associated with the more than one of the plurality of jackpot tables.

5. The electronic gaming device of claim 1, wherein the plurality of bingo card IDs comprises at least one of a numeric identifier, an alphabetical identifier, an alphanumeric identifier, a bingo pattern, or a hash value to represent a bingo pattern.

6. The electronic gaming device of claim 1, wherein the instructions further cause the at least one processor to determine the amount of bingo card IDs such that the amount of bingo card IDs is in proportion to the input amount.

7. The electronic gaming device of claim 1, wherein the instructions further cause the at least one processor to determine the subset of bingo card IDs such that the subset of bingo card IDs is in proportion to a number of bingo cards in the electronic game.

8. The electronic gaming device of claim 1, wherein the instructions further cause the at least one processor to:

receive player input identifying a plurality of bingo cards for the electronic game; and determine the plurality of bingo card parameters for the electronic game, wherein the plurality of bingo card parameters are associated with the plurality of bingo cards.

9. The electronic gaming device of claim 1, wherein the instructions further cause the at least one processor to determine the subset of bingo card IDs based at least in part upon the input amount by:

determining a proportion of the input amount as compared to a maximum input available for the electronic game; and determining the subset of bingo card IDs as a number of bingo card IDs that, when compared to the plurality of bingo card IDs, matches the proportion in order to scale jackpot eligibility probability based upon the input amount.

10. An electronic gaming system comprising a first electronic gaming device, the first electronic gaming device comprising:

at least one memory device storing instructions and a plurality of jackpot tables associated with a plurality of jackpots, each of the plurality of jackpot tables comprising a plurality of bingo card identifiers (IDs); and at least one processor in communication with the at least one memory device, wherein the instructions, when executed by the at least one processor, cause the at least one processor to:

determine an input amount associated with an electronic game played at the electronic gaming device;

determine a plurality of bingo card parameters for the electronic game;

determine a subset of bingo card IDs from the plurality of bingo card IDs stored in the plurality of jackpot tables in the at least one memory device based at least in part upon the input amount;

determine that at least one bingo card parameter of the plurality of bingo card parameters for the electronic game matches at least one bingo card ID of the subset of bingo card IDs; and based upon the at least one bingo card parameter for the electronic game matching the at least one bingo card ID, cause at least one jackpot of the plurality of jackpots to be outputted, wherein the at least one jackpot is associated with at least one jackpot table of the plurality of jackpot tables that comprises the at least one bingo card ID.

11. The electronic gaming system of claim 10, further comprising a second electronic gaming device, wherein the second electronic gaming device comprises:

a second at least one memory device storing the plurality of jackpot tables; and a second at least one processor configured to execute second instructions stored in the second at least one memory device, which when executed, cause the second at least one processor to:

determine a second input amount associated with the electronic game played at the second electronic gaming device;

determine a second plurality of bingo card parameters for a second electronic game;

determine a second subset of bingo card IDs from the plurality of bingo card IDs stored in the plurality of jackpot tables;

determine that at least one of the second plurality of bingo card parameters for the second electronic game matches at least one bingo card ID of the second subset of bingo card IDs; and based upon the at least one of the second plurality of bingo card parameters matching the at least one of the bingo card ID of the second subset of bingo card IDs, cause a second at least one jackpot to be outputted.

12. The electronic gaming system of claim 10, wherein the instructions further cause the at least one processor to cause the at least one jackpot to be outputted to a player account associated with a player playing the electronic game at the first electronic gaming device.

13. The electronic gaming system of claim 10, wherein the instructions further cause the at least one processor to determine the subset of bingo card IDs, wherein one or more of the subset of bingo card IDs are stored in more than one of the plurality of jackpot tables.

14. The electronic gaming system of claim 13, wherein the instructions further cause the at least one processor to cause the at least one jackpot to be outputted, wherein the at least one of the bingo card IDs is stored in more than one of the plurality of jackpot tables, and wherein at least one output amount comprises a sum of jackpots associated with the more than one of the plurality of jackpot tables.

15. The electronic gaming system of claim 10, wherein the plurality of bingo card IDs comprises at least one of a numeric identifier, an alphabetical identifier, an alphanumeric identifier, a bingo pattern, or a hash value to represent a bingo pattern.

16. The electronic gaming system of claim 10, wherein the instructions further cause the at least one processor to determine the amount of bingo card IDs such that the amount of bingo card IDs is in proportion to the input amount.

17. The electronic gaming system of claim 10, wherein the instructions further cause the at least one processor to determine the amount of bingo card IDs such that the amount of bingo card IDs is in proportion to a number of bingo cards in the electronic game.

18. The electronic gaming system of claim 10, wherein the instructions further cause the at least one processor to:

receive player input identifying a plurality of bingo cards for the electronic game; and determine the plurality of bingo card parameters for the electronic game, wherein the plurality of bingo card parameters are associated with the plurality of bingo cards.

19. At least one non-transitory computer-readable storage medium associated with an electronic gaming device and storing instructions and a plurality of jackpot tables associated with a plurality of jackpots, each of the plurality of jackpot tables comprising a plurality of bingo card identifiers (IDs), wherein the instructions, in response to execution by at least one processor, cause the at least one processor to:

determine an input amount associated with an electronic game played at the electronic gaming device;

determine a plurality of bingo card parameters for the electronic game;

determine a subset of bingo card IDs from the plurality of bingo card IDs stored in the plurality of jackpot tables in the at least one non-transitory computer-readable storage medium based at least in part upon the input amount;

determine that at least one bingo card parameter of the plurality of bingo card parameters for the electronic game matches at least one bingo card ID of the subset of bingo card IDs; and based upon the at least one bingo card parameter for the electronic game matching the at least one bingo card ID, cause at least one jackpot of the plurality of jackpots to be outputted, wherein the at least one jackpot is associated with at least one jackpot table of the plurality of jackpot tables that comprises the at least one bingo card ID.

20. The at least one non-transitory computer-readable storage medium of claim 19, wherein the instructions further cause the at least one processor to cause the at least one jackpot to be outputted to a player account associated with a player playing the electronic game.

* * * * *